United States Patent
Miller et al.

(10) Patent No.: US 9,354,823 B2
(45) Date of Patent: May 31, 2016

(54) MEMORY SYSTEM INCLUDING VARIABLE WRITE BURST AND BROADCAST COMMAND SCHEDULING

(71) Applicant: MoSys, Inc., Santa Clara, CA (US)

(72) Inventors: Michael J Miller, Saratoga, CA (US); Michael J Morrison, Sunnyvale, CA (US); Jay B Patel, Los Gatos, CA (US)

(73) Assignee: MoSys, Inc., Santa Clara, CA (US)

( * ) Notice: Subject to any disclaimer, the term of this patent is extended or adjusted under 35 U.S.C. 154(b) by 109 days.

(21) Appl. No.: 13/911,218

(22) Filed: Jun. 6, 2013

(65) Prior Publication Data

US 2013/0332681 A1    Dec. 12, 2013

Related U.S. Application Data

(60) Provisional application No. 61/656,453, filed on Jun. 6, 2012.

(51) Int. Cl.
*G06F 13/28* (2006.01)
*G06F 3/06* (2006.01)
(Continued)

(52) U.S. Cl.
CPC .......... *G06F 3/0659* (2013.01); *G06F 13/1626* (2013.01); *G06F 13/1642* (2013.01); *G06F 13/28* (2013.01); *G06F 3/0644* (2013.01); *G06F 9/3004* (2013.01)

(58) Field of Classification Search
CPC ...... G06F 9/3004; G06F 13/28; G06F 3/0644
USPC ......................................... 711/155, 167, 173
See application file for complete search history.

(56) References Cited

U.S. PATENT DOCUMENTS

| 5,930,359 | A | 7/1999 | Kempke et al. |
| 5,996,052 | A | 11/1999 | Taniguchi et al. |
| 6,279,051 | B1 | 8/2001 | Gates et al. |

(Continued)

FOREIGN PATENT DOCUMENTS

| CN | 1180900 | 5/1998 |
| CN | 1568607 | 1/2005 |

(Continued)

OTHER PUBLICATIONS

European Search report in Application No. 12162499.3-1229 dated Jul. 13, 2012, 6 pages.

(Continued)

*Primary Examiner* — Than Nguyen
(74) *Attorney, Agent, or Firm* — MHKKG (57) ABSTRACT

A system includes a host device that may be configured to initiate memory requests to a system memory. The system also includes a memory controller that may be configured receive the memory requests and to format the memory requests into memory transactions that are conveyed to the memory device via a memory interface. The memory transactions include a memory write burst command having a first frame that includes a corresponding opcode positioned in one of a first command slot or a second command slot. The memory write burst command may also include a number of subsequent frames for conveying a data payload, as specified for example, by the opcode. The control unit may be configured to generate a number of concurrent sequential memory write operations to the memory in response to receiving the memory write burst command.

43 Claims, 5 Drawing Sheets

(51) Int. Cl.
*G06F 13/16* (2006.01)
*G06F 9/30* (2006.01)

(56) References Cited

U.S. PATENT DOCUMENTS

| | | |
|---|---|---|
| 6,959,367 B2 | 10/2005 | Banno |
| 7,139,860 B2 | 11/2006 | Walker et al. |
| 7,558,270 B1 | 7/2009 | Wilford et al. |
| 7,631,313 B2 | 12/2009 | Mayhew et al. |
| 7,873,066 B2 | 1/2011 | Muff et al. |
| 8,069,327 B2 * | 11/2011 | Subashchandrabose et al. ............ 711/167 |
| 8,099,523 B2 | 1/2012 | Ajanovic et al. |
| 8,170,035 B2 | 5/2012 | Furey et al. |
| 8,416,770 B2 | 4/2013 | Fourcand |
| 8,539,196 B2 | 9/2013 | Roy |
| 2001/0030943 A1 | 10/2001 | Gregg et al. |
| 2003/0036400 A1 | 2/2003 | Casaccia |
| 2005/0273564 A1 | 12/2005 | Lakshmanamurthy et al. |
| 2006/0067370 A1 | 3/2006 | Yang |
| 2007/0189232 A1 | 8/2007 | Chang et al. |
| 2008/0059748 A1 | 3/2008 | Klint et al. |
| 2008/0177940 A1 | 7/2008 | Risse |
| 2009/0172260 A1 | 7/2009 | Olbrich et al. |
| 2009/0198847 A1 | 8/2009 | Norman |
| 2009/0240897 A1 * | 9/2009 | Kajigaya ............ 711/149 |
| 2010/0005212 A1 * | 1/2010 | Gower et al. .......... 710/308 |
| 2010/0122021 A1 | 5/2010 | Lee et al. |
| 2010/0185808 A1 | 7/2010 | Yu et al. |
| 2010/0306458 A1 | 12/2010 | Aho et al. |
| 2011/0060546 A1 | 3/2011 | Miller et al. |
| 2011/0074552 A1 | 3/2011 | Norair et al. |
| 2011/0191548 A1 | 8/2011 | Miller et al. |
| 2011/0261840 A1 | 10/2011 | Baptist et al. |
| 2012/0254562 A1 * | 10/2012 | Morrison et al. ........ 711/155 |

FOREIGN PATENT DOCUMENTS

| | | |
|---|---|---|
| EP | 0697664 | 2/1996 |
| JP | 2003-196084 | 7/2003 |

OTHER PUBLICATIONS

Office Action in Chinese Application No. 201210146921.X dated Mar. 2, 2015, 18 pages.
Office Action in Japanese Application No. 2012-083966 mailed Jun. 16, 2015, 9 pages.
Office Action in Chinese Application No. 201210146921.X mailed Sep. 16, 2015, 12 pages.
Notice of Preliminary Rejection in Korean Application No. 10-2012-0033541 mailed Oct. 1, 2015, 4 pages.
Office Action in European Application No. 12162499.3 mailed Jan. 5, 2016, 3 pages.

* cited by examiner

| 79 | 44 | 43 | 8 | 7 | 6 | 5 | 0 |
|---|---|---|---|---|---|---|---|
| L Command Slot | | R Command Slot | | TL=1 | A | CRC | |

| 79 | 72 | 71  69 | 68 | 44 | 43 | 8 | 7 | 6 | 5 | 0 |
|---|---|---|---|---|---|---|---|---|---|---|
| Read Opcode | | PID | Address | | R Command Slot | | TL=1 | A | CRC | |

| 79 | 44 43 | 36 35 33 32 | 8 7 | 6 5 | 0 |
|---|---|---|---|---|---|
| L Command Slot | Write Opcode | PID | Address | TL=1 | A | CRC |

| 79 | 44 43 | 8 7 | 6 5 | 0 |
|---|---|---|---|---|
| Data - Hi | Data - Lo | TL=1 | A | CRC |

420

| 79 | 44 43 | 36 35 33 32 | 8 7 | 6 5 | 0 |
|---|---|---|---|---|---|
| L Command Slot | Write Opcode | PID | Address | TL=1 | A | CRC |

| 79 | 44 43 | 8 7 | 6 5 | 0 |
|---|---|---|---|---|
| Data - Hi | Data - Lo | TL=1 | A | CRC |

| 79 | 44 43 | 8 7 | 6 5 | 0 |
|---|---|---|---|---|
| Data - Hi | Data - Lo | TL=1 | A | CRC |

⋮

| 79 | 44 43 | 8 7 | 6 5 | 0 |
|---|---|---|---|---|
| Data - Hi | Data - Lo | TL=1 | A | CRC |

| 79 | 44 43 | 8 7 | 6 5 | 0 |
|---|---|---|---|---|
| Data - Hi | Data - Lo | TL=1 | A | CRC |

| 79 | 44 43 | 36 35 33 32 | 8 7 | 6 5 | 0 |
|---|---|---|---|---|---|
| L Command Slot | Write Opcode | PID | Address | TL=1 | A | CRC |

| 79 | 44 43 | 8 7 | 6 5 | 0 |
|---|---|---|---|---|
| L Command Slot | Data - Hi | TL=1 | A | CRC |

| 79 | 44 43 | 8 7 | 6 5 | 0 |
|---|---|---|---|---|
| L Command Slot | Data - Lo | TL=1 | A | CRC |

440

| 79 | 72 71 69 68 | 44 43 | 8 7 | 6 5 | 0 |
|---|---|---|---|---|---|
| Write Opcode | PID | Address | Data - Hi | TL=1 | A | CRC |

| 79 | 72 71 69 68 | 44 43 | 8 7 | 6 5 | 0 |
|---|---|---|---|---|---|
| Write Opcode | PID | Address | Data - Lo | TL=1 | A | CRC |

MEMORY SYSTEM INCLUDING VARIABLE WRITE BURST AND BROADCAST COMMAND SCHEDULING

PRIORITY CLAIM

This application claims priority to U.S. Provisional Patent Application Ser. No. 61/656,453, filed on Jun. 6, 2012, and which is herein incorporated by reference in its entirety.

CROSS-REFERENCE TO RELATED APPLICATIONS

This application is related to commonly owned U.S. patent application Ser. No. 12/697,141 to Michael Miller and Richard S. Roy, entitled "High Utilization Multi-Partitioned Serial Memory."

BACKGROUND

1. Technical Field

This disclosure relates to memory systems, and more particularly to memory command scheduling on a memory interface.

2. Description of the Related Art

In many computer systems, a memory device may be read from and written to using a variety of conventional memory interfaces and protocols. For example, in some conventional protocols, separate channels may exist for transmitting a memory command, the address, and the associated write data. Bandwidth may be allocated to each of these channels based on the bandwidth need for the respective channel. This type of interface may have drawbacks. More particularly, bandwidth may be lost on some of the channels since some of the channels will not need nearly as much bandwidth as other channels. Some conventional memory protocols may have additional drawbacks. For example, the data for a write command may only be sent at a specific time relative to the write command. This type of command and data scheduling may also limit bandwidth, depending on when and how many read commands or other commands may be concurrently pending.

SUMMARY OF THE EMBODIMENTS

Various embodiments of a memory system including variable write burst and write broadcast command scheduling are disclosed. In one embodiment, a memory subsystem includes a memory device and a control unit. The control unit may be configured to read and write the data to the memory device in response to receiving memory transactions. The memory transactions include a memory write burst command having a first frame that includes a corresponding opcode positioned in one of a first command slot or a second command slot. The memory write burst command may also include a number of subsequent frames for conveying a data payload, as specified for example, by the opcode. The control unit may be configured to generate a number of concurrent sequential memory write operations to the memory in response to receiving the memory write burst command.

In one particular implementation, the memory device may include a number of independently accessible memory partitions that are numbered sequentially from a first partition to a last partition. The control unit may be configured to sequentially write the data payload from each subsequent frame to the same address in a different memory partition beginning with a partition specified in the memory write burst command. The control unit may further write to the different memory partitions in a repeating order that is specified in a slotted wheel. The order includes each partition from the first partition to the last partition.

In another embodiment, the memory transactions include a memory write broadcast command having a first frame that includes a corresponding opcode positioned in one of a first command slot or a second command slot, and one or more subsequent frames for conveying a data payload. In response to receiving the memory write broadcast command, the control unit may be configured to generate a number of concurrent sequential memory write operations to write the data payload to a number of locations within the memory device.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION OF THE EMBODIMENTS

Figure 1:
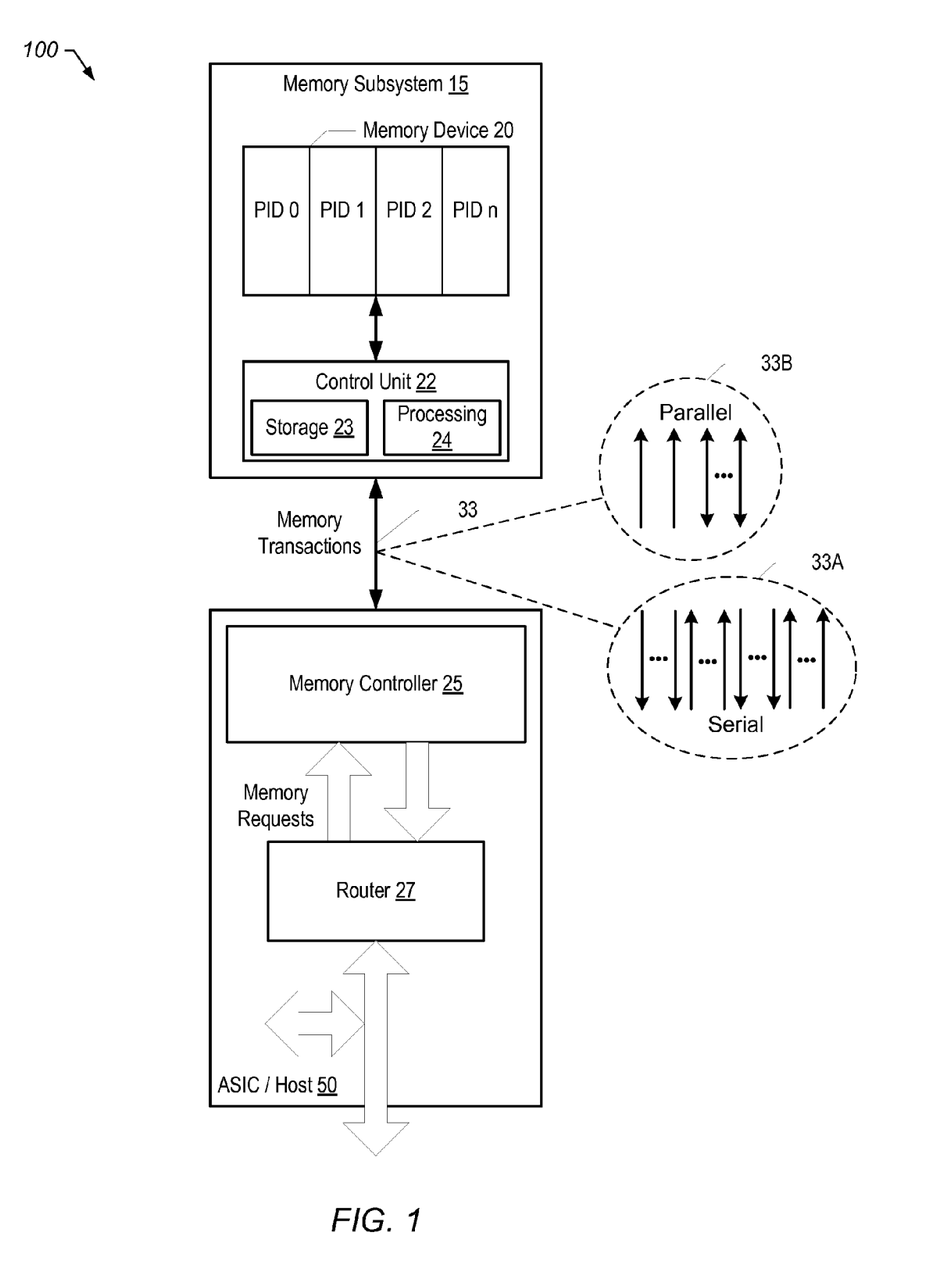
FIG. 1 is a block diagram of one embodiment of system including a memory subsystem.

Turning now to FIG. 1, a block diagram of one embodiment of a system including a memory subsystem is shown. The system 100 includes an application specific integrated circuit (ASIC)/host 50 coupled to a memory subsystem 15 via an interface 33. In the illustrated embodiment, the ASIC/host 50 includes a router 27 coupled to a memory controller 25. The memory subsystem 15 includes a control unit 22 coupled to a memory device 20.

In one embodiment, the ASIC/host 50 may receive memory requests from internal or external sources. The router 27 may forward the memory requests to the memory controller 25. The memory controller 25 may format the memory requests into memory transactions suitable for transmission on interface 33 to memory subsystem 15. In various embodiments, the memory transactions may include memory write transactions, memory read transactions, and memory read-modify-write (RMW) transactions. As shown in FIG. 2 through FIG. 5, the memory transactions may be formatted into 80-bit frames, although other numbers of bits are possible and contemplated. In one embodiment, the frames may be used at the transaction layer.

As described further below in conjunction with the description of FIG. 4A through FIG. 4D, the memory write transactions may include a number of different types of write commands. More particularly, the memory controller 25 may be configured to format the memory write transactions to take advantage of the bandwidth available on interface 33 by using different types of write commands that have different data payload scheduling.

In FIG. 1, control unit 22 may receive the memory transactions from the memory controller 25, decode the different command opcodes, reformat the transactions and send them to memory device 20. Therefore, control unit 22 may be configured to control the operation of, and the sending and receiving of data to memory device 20. As shown, control unit 22 includes a storage unit 23. In one embodiment, storage unit 23 may store a number of base addresses that may be used during the read-modify-write operations. As described in greater detail below in conjunction with the description of FIG. 5 and FIG. 6, the base addresses may be written using a special write frame. In addition, the processing unit 24 of control unit 22 is configured to perform a number of logical and arithmetic functions on data read from memory device 20 as part of the modify phase of a read-modify-write (RMW) memory transactions.

Memory device 20 may include one or more memory arrays for storing data. For example, in one particular implementation, the one or more memory arrays of memory device 20 may be implemented using 1T-SRAM cells. In the illustrated embodiment, the memory device 20 includes a number of sub-sections. The subsections are referred to as partitions. Each partition may include a number of banks (not shown). As shown, the partitions are numbered 0 through n, where n may be any number in the set of natural numbers, including zero. In one embodiment, each of the partitions may be independently accessible via the partition number, which is also referred to as the partition identifier (PID). In addition, as described in more detail below the partitions may be concurrently accessed, and each partition may be multi-ported, and thus depending on which bank within a partition is being accessed, each partition may be written and read concurrently.

In one embodiment, the control unit 22 may access the memory device partitions in a round robin fashion using the concept of a slotted wheel. More particularly, each partition may be assigned to a given slot in the wheel, and each system clock cycle, the wheel is moved to the next slot, such that the partition in the next slot will be accessed in that next clock cycle. In one implementation, the memory device 20 may have a cycle time that is slower than the period of the system clock. Thus, the memory clock may operate at a slower the frequency than the system clock. To obtain memory throughput at system clock speeds, memory accesses may be sequenced, one per partition, each system clock cycle, using the slotted wheel. In one embodiment, the partitions being accessed may depend, for example, on the number of communication lanes being used on the memory interface 33. More particularly, when a high number of lanes (e.g., eight) are being used, a different partition may be accessed in each system clock cycle. However, when a smaller number of lanes (e.g., four) are being used, two partitions may be accessed every other system clock cycle. Example partition access patterns are shown in Table 1 below.

TABLE 1

Slotted wheel partition access pattern

| Config | Partition Access Cycle | | | | | | | |
|---|---|---|---|---|---|---|---|---|
| | 0 | 1 | 2 | 3 | 4 | 5 | 6 | 7 |
| 8xn | P0 | P1 | P2 | P3 | P0 | P1 | P2 | P3 |
| 4xn | — | P0/P2 | — | P1/P3 | — | P0/P2 | — | P1/P3 |
| 2xn | — | — | — | P0/P1/P2/P3 | — | — | — | P0/P1/P2/P3 |
| 1xn | — | — | — | — | — | — | — | P0/P1/P2/P3 |

In the example shown in Table 1, there are four partitions, thus there are four slots in the wheel, and each partition may be assigned to a respective slot. The leftmost column is labeled "Config" and is representative of the number of lanes used in the memory interface 33. The cycle columns are representative of system clock cycles. In this example, in system clock cycle 0, partition P0 would be accessed. In cycle 1, partition P1 would be accessed, and so on. However, since there are only four partitions, at cycle 4, partition P0 is again accessed, and the pattern is repeated. As described further below in conjunction with the description of the Burst mode commands, addressing within the partitions may be changed (e.g., incremented) when a burst length exceeds the number of partitions. In addition, when there are fewer lanes in the memory interface 33, control unit 22 may access the partitions differently. For example, in row 2 where there are only four lanes, partitions P0 and P2 may be accessed during system clock cycles 1 and 5, while partitions P1 and P3 may be accessed during system clock cycles 3 and 7.

Thus, by accessing a different partition during each system clock cycle, there can effectively be one memory access each system clock cycle when necessary. Access to a particular partition is a function of the control interface configuration and the partition's place in a slotted wheel. In one embodiment, the slotted wheel may be synchronized during the link training and initialization.

In one embodiment, memory device 20 and control unit 22 may be coupled via a parallel interconnect, although it is contemplated that in other embodiments any type of interconnect may be used. In addition, memory device 20 and control unit 22 may be implemented on the same integrated circuit (IC) die. Furthermore, in other embodiments, memory subsystem 15 and ASIC/host 50 may also be implemented on the same IC die, or in the same package, as desired.

In various embodiments, interface 33 may be a serial interconnect or a parallel interconnect, depending on the specific implementation. In serial interconnect implementations (e.g. 33A), interface 33 may include one or more serial channels. Each channel may include one or more unidirectional or bi-directional communication lanes. In implementations with a single serial lane, a given frame may be sent serially in a single bitstream across the lane. However, in implementations that include multiple lanes per channel, the 80-bit frame may be transmitted across one or more of the lanes in a given channel. In parallel implementations (e.g., 33B), interface 33 may include a number of unidirectional command and address signal paths and a number of bidirectional data signal paths that make up a parallel bus, and the 80-bit frame may be transmitted in a traditional parallel format across the parallel bus. It is noted that in implementations that use a serial interface for interface 33, memory controller 25 may concurrently send on different channels of interface 33 various different memory transactions.

As described further below, the memory controller 25 may take advantage of the different types of memory transactions to improve bandwidth. More particularly, by using different types of memory read and write transactions, various memory write transactions and memory read transactions may be combined and, depending on how much data needs to be read from or written to memory device 20, memory controller 25 may choose the different ones of the memory read and write commands at different times.

Figure 2:
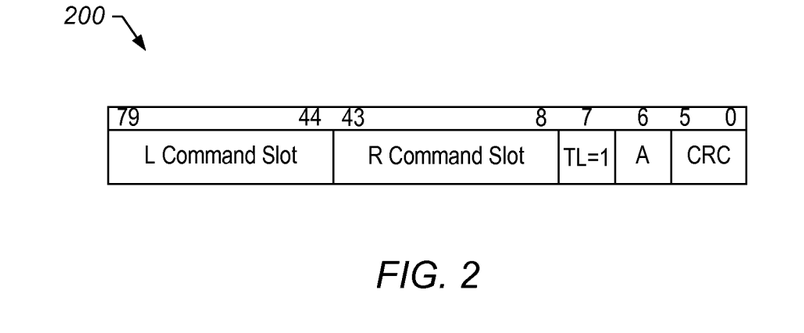
FIG. 2 is a diagram depicting one embodiment of a non-specific memory transaction frame.

Turning to FIG. 2, a diagram depicting one embodiment of a non-specific memory transaction frame is shown. The frame 200 is an 80-bit frame that includes a number of fields. As shown in the illustrated embodiment, the frame 200 includes a cyclic redundancy code (CRC) field in bits zero through five. Bit six corresponds to an acknowledge bit 'A', while bit seven corresponds to a transaction layer field (TL) in which an encoding of one indicates the frame is a transaction layer frame. Bits eight through 43 correspond to one command slot, designated here as the R (i.e. right) command slot, and bits 44 through 79 correspond to another command slot, designated here as the L (i.e. left) command slot. As described further below, each of the L and R command slots may contain information corresponding to a read command, a write command, a RMW command, or data depending on what information is in the frame or the preceding frame. In various embodiments, either one or both command slots of a frame may be used in a given transaction. It is noted that although the A and TL bits are shown in FIG. 2, in other embodiments, these bits may have different meanings or they may be unused, as desired.

Figure 3:
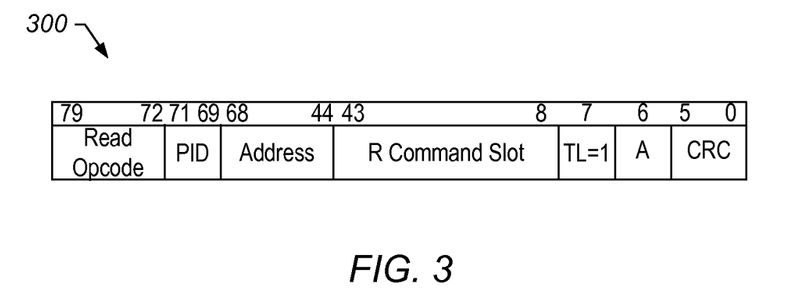
FIG. 3 is a diagram depicting one embodiment of a memory read transaction.

Referring to FIG. 3, a diagram depicting one embodiment of a memory read transaction is shown. The read frame 300 includes a read instruction that includes a read command opcode, a PID, and an address. As shown, the read command opcode, the PID, and the read address are positioned in the L command slot of the read frame 300. As shown, the R command slot is empty. However, in other embodiments, two read commands may be issued in one frame. As such both the L and R command slots would include a read command opcode and an associated address. In addition, as described further below, a read command may be issued in one command slot (e.g., the L command slot), and a write command may be included in the other command slot.

In various embodiments, there may be a number of different read opcodes, each specifying a different type of read transaction. For example, in one embodiment a given read opcode may specify a read operation of the data in the partition specified by the PID, at the address specified in the read frame. Thus, that read opcode may indicate to control unit 22 of FIG. 1 to perform a read operation in the specified PID at the specified address.

In additional embodiments, one or more different read opcodes may specify burst read operations of particular lengths, and an address in each read transaction may be the starting address of the read burst. More particularly, one read burst opcode may specify for example, two successive memory read operations, while other read opcodes may specify four, eight, sixteen, or more successive read operations. In one embodiment of the burst read operations, the first read operation of the burst may be to the PID specified in the frame, while the next read may be to the next PID in the sequence specified by the slotted wheel, for example. However, there may be different ways of accessing the memory partitions, and thus different read burst commands and corresponding opcodes depending on, for example, the number of partitions and the number of data payload frames.

More particularly, in one embodiment, one read burst opcode may specify that the first read operation of the burst may be to the PID specified in the command frame, and the second read operation may be to the next PID in the sequence specified by the slotted wheel, and so on. However, the memory address specified in the read command frame may stay the same for all of the read operations as long as the number of reads does not exceed the number of partitions. In cases in which the number of memory read operations does exceed the number of partitions, the address may be incremented or added to, once the partition sequence is repeated to avoid reading the same data in a given partition. To accommodate this scenario, there may be two types of read bursts, and each type may specify multiple burst lengths.

In an embodiment of the first type of read burst mode, the read burst opcode may specify that whenever a partition sequence boundary is crossed, the address is incremented or added to. For example, assume there are four partitions and they are designated [0:3], and a read burst of eight is specified by the opcode. Each time partition three has been read, the address is incremented prior to partition zero being read, regardless of which PID was specified in the read command frame. This burst mode may be referred to as a linear read burst mode.

In an embodiment of the second type of burst mode, a different read burst opcode may specify that the address is incremented or added to each time all of the partitions have been read, and the partition sequence is about to repeat. For example, assume there are four partitions designated [0:3], and a read burst of eight is specified by the opcode, beginning in partition two. Each time partition one has been read, the address is incremented prior to partition two being read again.

In FIG. 4A through FIG. 4E, various write transactions are shown. Each write command may include a different opcode that specifies the type and format of the write command, and the number of data payload frames that will follow the write command frame.

Figure 4A:
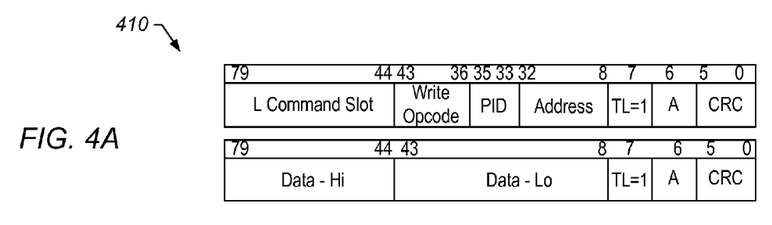
FIG. 4A is a diagram depicting one embodiment of a memory write transaction.

Turning now to FIG. 4A, a diagram depicting one embodiment of a memory write transaction including two frames is shown. Similar to the read transaction frame in FIG. 3, the first bits 0-7 of the top frame of write transaction 410 of FIG.

4A include CRC bits and various control bits such as transaction layer indication bits, for example. In the illustrated embodiment, the L command slot is empty, while the R command slot includes a write command opcode, the PID, and an address in bits 8-43. However, in the bottom frame the data for the above write command is transmitted in bits 8-79, thereby providing a data payload of 72 bits. It is noted that the top frame may be referred to as the command frame and the bottom frame may be referred to as the data frame. In the data frame, the data payload is broken up into Data Hi and Data Lo, where the Data Hi is transmitted in bits 44-79 (e.g., L command slot) and Data Lo is transmitted in bits 8-43 (e.g., R command slot). As mentioned above, since the L command slot of the command frame is empty in this embodiment, it is noted that a read command may be placed into the L command slot. In one embodiment, the write command opcode corresponds to a particular opcode encoding that indicates to the control unit 22 of FIG. 1 that the entire 72-bit data payload for this write command will follow in the next frame.

Figure 4B:
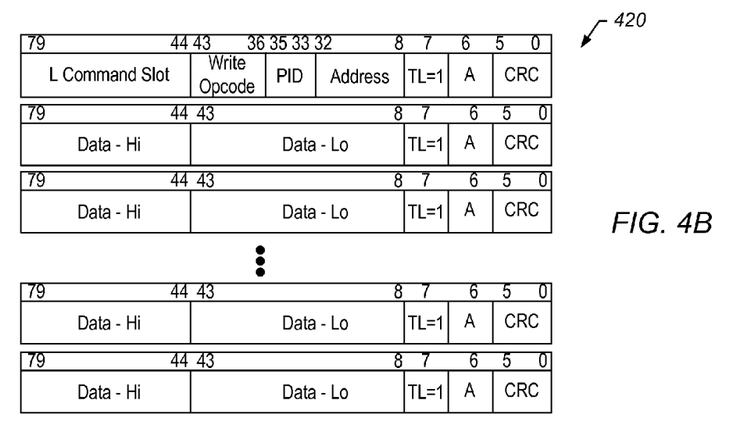
FIG. 4B is a diagram depicting one embodiment of a burst memory write transaction including five frames.

Referring to FIG. 4B, a diagram depicting one embodiment of a burst memory write transaction including five frames is shown. In the illustrated embodiment, the top frame of write transaction 420 is the command frame, and the bottom four frames are the data frames. The command frame in FIG. 4B is similar to the command frame in FIG. 4A except that the opcode would be different to specify one or more types of write burst commands. More particularly, in various embodiments there may be a number of write burst opcodes that specify different numbers of payload frames as indicated by the ellipses. For example, there may be write bursts followed by two, four, eight, sixteen or more data payload frames. In addition, as described further below, similar to the burst read commands, there may be different ways of accessing the memory partitions, and thus different write burst commands and corresponding opcodes depending on, for example, the number of partitions and the number of data payload frames.

More particularly, in one embodiment, one write burst opcode may specify that the first write operation of the burst may be to the PID specified in the command frame, and the second write operation may be to the next PID in the sequence specified by the slotted wheel, and so on. However, similar to the read commands described above, the memory address specified in the write command frame may stay the same for all of the write operations as long as the number of writes does not exceed the number of partitions. In cases in which the number of memory write operations does exceed the number of partitions, the address may be incremented or added to, once the partition sequence is repeated to avoid overwriting data in a given partition. This is referred to as indexing. To accommodate this scenario, there may be two types of write bursts, and each type may specify multiple burst lengths.

In an embodiment of the first type of write burst mode, the write burst opcode may specify that whenever a partition sequence boundary is crossed, the address is incremented. For example, assume there are four partitions and they are designated [0:3], and a write burst of eight is specified by the opcode. Each time partition three has been written, the address is incremented prior to partition zero being written, regardless of which PID was specified in the write command frame. This burst mode may be referred to as a linear write burst mode.

In an embodiment of the second type of burst mode, a different write burst opcode may specify that the address is incremented each time all of the partitions have been written to, and the partition sequence is about to repeat. For example, assume there are four partitions designated [0:3], and a write burst of eight is specified by the opcode, beginning in partition two. Each time partition one has been written, the address is incremented prior to partition two being written again.

Accordingly, in various embodiments there may be a set of write burst linear opcodes that specify the different write burst lengths and one way of accessing the partitions, and another set of write burst opcodes that specify the different write burst lengths and another way of accessing the partitions in cases in which the number of writes exceeds the number of partitions.

It is noted that similar to the command frame shown in FIG. 4A and as noted above, the L command slot in FIG. 4B is also empty. However, the L command slot may include a non-write command such as a read or other command, for example. In one embodiment, control unit 22 upon receiving a command frame having a read command in the L command slot may process the read command first and then the write command.

It is noted that while the examples described above only describe bursts of a specific type (e.g., write or read), various bursts lengths may be intermingled with each other, and with other non-burst opcodes as well. For example, a write burst of two may be followed by a write burst of eight, and each of those write bursts may include a read burst of two, or four, or whatever size as desired.

Figure 4C:
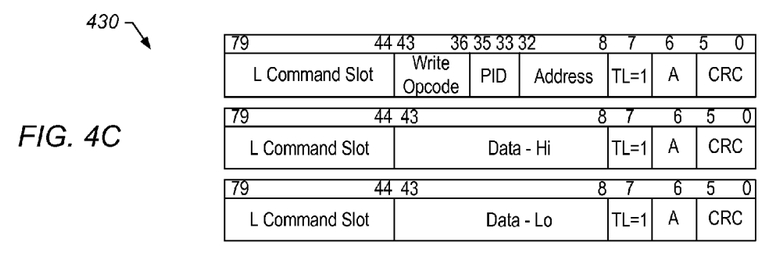
FIG. 4C is a diagram depicting another embodiment of a memory write transaction.

Referring now to FIG. 4C, a diagram depicting one embodiment of a memory write transaction including three frames is shown. In the illustrated embodiment, the command frame of write transaction 430 is similar to the command frame shown in FIG. 4B and FIG. 4A. However, in the write transaction 430, the write command opcode indicates to the control unit 22 that the data payload will be transmitted in the next two subsequent frames, one 36-bit half word at a time. However, as shown in FIG. 4C, the Data Hi half word is transmitted in the next subsequent frame while the Data Lo half word is transmitted in the second subsequent frame. Again in all three frames of transaction 430 the L command slot is empty. However, as noted above, a non-write command could be inserted in each of these L command slots. Accordingly, memory controller 25 may take advantage of the available bandwidth by inserting commands such as read commands, for example, into each of these frames.

In many systems, it may be desirable to reduce the memory cycle latency when accessing memory during a read operation. It is noted that having the same data available in multiple places may make it possible to have a memory with a lower memory cycle time ($t_{rc}$). For example, being able to read the same data from two locations may allow the host 50 to read from the memory 20 at twice the rate as would otherwise be possible. If more locations are written with the same data, even greater latency reductions may be realized during a subsequent read operation. More particularly, as described above the slotted wheel determines which partition is next in the sequence whenever a read command is received. Thus, if a read command specifies a PID of two, and the slotted wheel is on PID three, it may be as many as four cycles before PID two is read again in a four-partition memory. However, if a host knows that a particular piece of data may be accessed frequently, it may be beneficial for the host to write that data to multiple partitions to reduce the time associated with accessing the memory since the data is written to multiple partitions, there may be little or no waiting for a particular partition to be read again. For example, in a case where all partitions at a given address are written with same data, the host may simply perform a read operation to any partition, and there will be no waiting for a particular partition to be read. To reduce the bandwidth required to write the memory more than once, broadcast write commands are available. Various embodiments of broadcast write commands are described below.

Accordingly, to accommodate a lower memory read cycle time, in various embodiments, the write command frames shown in FIG. 4A and FIG. 4C may be used to specify various types of broadcast write commands. More particularly, write data specified in the data payload frames may be written (i.e., copied) to multiple partitions with a single write command frame. In various embodiments, the data may be written to the partitions in multiples of two or four. In addition, the write broadcast commands may include both sequential and interleaved write operations.

More particularly, sequential operation refers to a broadcast write command followed by one frame of data such as shown in FIG. 4A. In one embodiment, the write command frame may include an opcode that specifies a sequential broadcast write operation and the number of partitions that will be written. The PID specifies the starting PID, and the address is the same for all writes. For example, one such opcode may specify a broadcast write sequential to two partitions. In this case, the write operation would write the data contained in the next data frame to the PID specified in the command frame and to the next PID in the sequence specified in the slotted wheel at the address specified in the command frame. Another opcode may similarly specify a broadcast write sequential to four partitions in the sequence specified in the slotted wheel at the address specified in the command frame. It is noted that in other embodiments, other numbers of partitions may be written. Table 1 below illustrates a memory address with four partitions. Only partition 0 of the address has been written using a normal write command. Table 2 illustrates a memory address with four partitions which has been written with the same data in each of the four partitions using a write broadcast command.

TABLE 1

| Normal write | | | |
| --- | --- | --- | --- |
| Partition 0 | Partition 1 | Partition 2 | Partition 3 |
| A | — | — | — |

TABLE 2

| Broadcast write to four partitions | | | |
| --- | --- | --- | --- |
| Partition 0 | Partition 1 | Partition 2 | Partition 3 |
| A | A | A | A |

In Table 3, a memory address with four partitions has been written using a write broadcast command to only two partitions (P0 and P1). In this case, the two partitions are sequential.

TABLE 3

| Broadcast write sequential to multiple partitions but less than all | | | |
| --- | --- | --- | --- |
| Partition 0 | Partition 1 | Partition 2 | Partition 3 |
| A | A | — | — |

The interleaved operation refers to a broadcast write command followed by two frames that include data such as shown in FIG. 4C. In one embodiment, the write command frame may include an opcode that specifies broadcast write interleaved and the number of partitions that will be written. The PID specifies the starting PID, and the address is the same for all writes. For example, one such opcode may specify a broadcast write interleaved to two partitions. In this case, the write operation would write the data contained in the next two data frames to both the address in the PID specified in the command frame and to the same address in the next PID in the sequence specified in the slotted wheel. Another opcode may similarly specify a broadcast write interleaved to four partitions in the sequence specified in the slotted wheel. It is noted that in other embodiments, other numbers of partitions may be written.

In Table 4, a memory address with four partitions has been written using a write broadcast command to only two partitions (P0 and P2). However, in this case, the two partitions are interleaved as shown.

TABLE 4

| Broadcast write interleaved to multiple partitions but less than all | | | |
| --- | --- | --- | --- |
| Partition 0 | Partition 1 | Partition 2 | Partition 3 |
| A | — | A | — |

As described above, a subsequent read operation to an address having the same data written to multiple partitions may incur a lower latency than a read operation to an address having the needed data in a single partition. More particularly, in various embodiments, a host device such as ASIC/host 50 may monitor the position of the slotted wheel. In the case of a normal write operation that writes data to a single partition, the host has the option of either waiting to send a read command until the slotted wheel will be accessing the partition that holds the needed data, or to send the read command at any time, and wait for the slotted wheel to advance to the partition that contains the needed data and was specified in the read command.

However, in the case of a write broadcast command, the host may also keep track of and maintain which addresses to which a broadcast write has been made. In such embodiments, the host device may select a PID that will yield the lowest latency upon a read of the data that has been written using a broadcast write. For example, if the host has written all four partitions of an address with the same data, the host device may send the read command at any time and select for the read command whichever partition the slotted wheel will be accessing next. Then as the read command is received the control unit will access the partition specified in the read command thereby reducing the read latency. In such embodiments, the read latency may be reduced by a factor of four. Similarly, when two partitions (or other partial broadcast writes less than all partitions) have been written with the same data, the read latency may be reduced by a factor of two when the host sends a read command that specifies a particular partition. In such cases, the slotted wheel may only need to advance two slots to access the requested partition.

It is noted that in another embodiment, to take advantage of situations in which all partitions have been written with the same data, the read command may include a special read broadcast opcode that specifies to the control unit to simply read the next partition regardless of which partition the slotted wheel will access. It is also noted that in another embodiment, the read command may include a normal read opcode, but the PID field is null, or has predetermined value that specifies to the control unit to read the next partition regardless of which partition the slotted wheel will access.

Figure 4D:
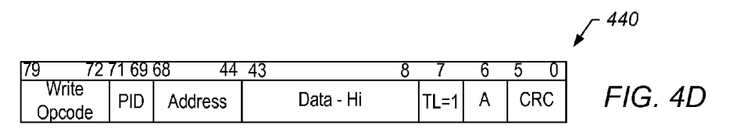
FIG. 4D is a diagram depicting another embodiment of a memory write transaction.

Referring now to FIG. 4D, a diagram depicting another embodiment of a write transaction is shown. In the illustrated embodiment, write transaction 440 includes a single frame that includes a write command opcode in the L command slot and rather than another command in the R command slot, a data payload is conveyed. In the illustrated embodiment, the data payload is sent as a half word. More particularly, the Data-Hi half word is sent in the R command slot. Thus, the write opcode indicates to the control unit 22 that only the upper half word of a 72-bit data payload is being transmitted in the current frame.

Figure 4E:
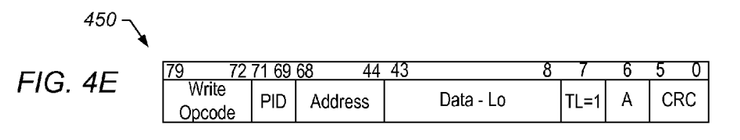
FIG. 4E is a diagram depicting another embodiment of a memory write transaction.

Referring to FIG. 4E, a diagram depicting another embodiment of a write transaction is shown. Similar to the transaction 440 of FIG. 4D, transaction 450 of FIG. 4E includes a single frame that includes a write command opcode in the L command slot and a data payload in the R command slot. In the embodiment of FIG. 4E, the data payload is also sent as a half word, but the Data-Lo half word is sent in the R command slot. Thus, the write opcode indicates to the control unit 22 that only the lower half word of a 72-bit data payload is being transmitted in the current frame.

In one embodiment, the transactions shown in FIGS. 4D and 4E may be used together or separately, as desired. Accordingly, from the above embodiments shown in FIG. 4A-FIG. 4E, memory controller 25 may best use the bandwidth available by using a variety of different types of write commands.

In another embodiment, half word write transactions may be performed in additional ways. More particularly, memory controller 25 may use additional write opcodes to perform half word writes, where the write opcode may specify which of the upper or lower half word is being sent. In one embodiment, the write command may be sent in the R command slot and that the half word of data will be sent in either the R command slot or the L command slot of the next frame. In such an embodiment, the write opcode may specify whether the data payload is the Data Hi or Data Lo half word and which of the R command slot or the L command slot the data will occupy.

In particular, as described above, it may be useful to copy data to more than one partition to reduce read latency. Accordingly, similar to the broadcast write commands described above, in various embodiments, the write command frames shown in FIG. 4C, FIGS. 4D and 4E may also be used to specify additional types of broadcast write commands. More particularly, 36-bit write data may be written (i.e., copied) to multiple partitions with a single write command frame. In various embodiments, the data may be written to the partitions in multiples of two or four as desired. For example, as shown in FIG. 4C, a write broadcast opcode may be positioned in the R command slot, and a 36-bit Data-Hi payload or a Data-Lo payload may be conveyed in the next subsequent frame, with no third frame. In such an embodiment, the L command slot may be empty or it may include any type of read command, for example.

In addition, the transactions in FIG. 4D and FIG. 4E may be used for broadcast write commands. For example, in FIG. 4D, a write broadcast opcode may be positioned in the L command slot, and the 36-bit Data-Hi payload may be conveyed in the R command slot. The opcode may specify writing the Data-Hi payload to multiple partitions as above. Similarly, a write broadcast opcode may be positioned in the L command slot of FIG. 4E, and a 36-bit Data-Lo payload may be conveyed in the R command slot. The opcode may specify writing the Data-Lo payload to multiple partitions as above.

In another embodiment, the transactions in FIG. 4D and FIG. 4E may be used for a hybrid type of broadcast write command. It may be referred to as a memory write broadcast block command, or a memory write burst broadcast command. More particularly, rather than a 36-bit, or a 72-bit data payload, the payload may be a burst payload that represents a block of burst data of virtually any length. In such an embodiment, the same data payload may be written to a given address across all partitions (e.g., broadcast), and then a next data payload may be written to additional addresses, in the same sequence (e.g., burst). Accordingly, payloads of virtually any size may be broadcast to multiple locations. More particularly, the broadcast may be ½-word, full-word, or multiple length word of arbitrary size. Accordingly, the broadcast burst write command may be represented as Write Broadcast X, Y, where X corresponds to quantity of partitions written, and Y corresponds to the data payload size. As described above, the data payload may be specified as upper or lower word or ½ word, word, or multi-word. Table 5 below illustrates a memory segment that has been written using a memory write broadcast block command that writes a burst of data (d1-d3) to four addresses (M0-M3), each having four partitions (P0-P3). Table 6 illustrates a similar memory write broadcast block command that writes a burst of data (d1-d3) to four addresses (M0-M3). However, in Table 6 only two of the four partitions (P0-P1) are written.

TABLE 5

Broadcast block write command

|    | M0 | M1 | M2 | M3 |
|----|----|----|----|----|
| P0 | d1 | d2 | d3 | d4 |
| P1 | d1 | d2 | d3 | d4 |
| P2 | d1 | d2 | d3 | d4 |
| P3 | d1 | d2 | d3 | d4 |

TABLE 6

Broadcast block write command to multiple partitions but less than all

|    | M0 | M1 | M2 | M3 |
|----|----|----|----|----|
| P0 | d1 | d2 | d3 | d4 |
| P1 | d1 | d2 | d3 | d4 |
| P2 | —  | —  | —  | —  |
| P3 | —  | —  | —  | —  |

Figure 5:
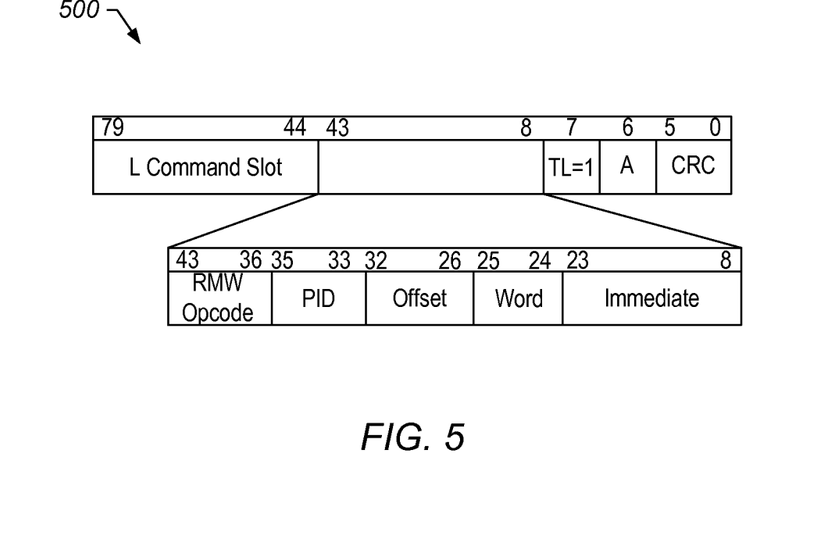
FIG. 5 is a diagram depicting one embodiment of a memory read-modify-write transaction.

Turning to FIG. 5, a diagram depicting one embodiment of a read-modify-write transaction including one frame is shown. Similar to the read transaction frame in FIG. 3 and the write transaction frames of FIG. 4A-FIG. 4E, the first bits 0-7 of the top frame of RMW transaction 500 include CRC bits and various control bits such as transaction layer indication bits. In the illustrated embodiment, the L command slot is empty, while the R command slot includes a RMW command opcode. However, rather than just a PID and an address in the address field as in the read and write command frames, the RMW addressing is different. In the embodiment shown in FIG. 5, bits eight through 35 include a 16-bit immediate operand, bits 24-25 include a two-bit Word encoding, and bits 26 through 32 include a seven-bit offset.

In the system 100 of FIG. 1, a RMW transaction may allow memory data to be modified with a minimum number of memory transactions being sent across interface 33. For example, a single RMW transaction sent across interface 33 may allow the data at a particular address to be modified.

Memory addresses may be given as offsets relative to a base address that may be preloaded into the storage 23 of FIG. 1.

In one embodiment, the RMW modify operations include 16, 32, and 64-bit arithmetic logic unit (ALU) operations that include addition and subtraction operations such as saturating addition subtraction and modulo $2^n$ addition and subtraction. In addition, the following logical operations may also be performed: AND, OR and exclusive-OR (XOR). Further, various other arithmetic or logical operations such as shifts, compares, increment, decrement, and the like, may be performed. Each of these different types of RMW operations may have a corresponding RMW command opcode encoding. In one embodiment, the control unit 22 may include processing functionality 24 to perform these operations, among others.

Referring back to FIG. 5, in one embodiment, each of the RMW commands performs an operation between the 16-bit immediate operand in bits [23:8] of the frame with a 16, 32 or 64-bit operand stored at an address in the memory device 20 as specified by the RMW opcode. Once the memory operand has been modified, the control unit 22 writes the result back to the memory device. The memory address may be computed by combining (e.g., ADD, XOR, etc) the offset field (e.g., bits [32:26]) with the base address previously loaded into the storage 23. The PID field (e.g., bits [35:33]) may select one of the base addresses (i.e., the partition) within storage 23. The size and alignment of the data may be determined by the RMW opcode in combination with the Word field. More particularly, for 16 and 32-bit RMW commands, the Word value may determine which bits of the memory operand is the data, while for 64-bit RMW commands, the Word field is ignored since the data is implied to be all 64 bits.

In another embodiment, one or more additional RMW opcodes may specify variable data sizes to be operated on. More particularly, one RMW opcode may specify two different and independent operations to be performed on two different portions of a memory operand. For example, one such RMW opcode may specify that one portion of the memory operand will be 40 bits and the other portion is 24 bits. In addition, the same RMW opcode may specify that the control unit 22 will perform one operation such as an increment or decrement, for example, on the 24-bit portion, and another operation such as an XOR with the 16-bit immediate operand of the frame, for example on the 40-bit portion. Thus, with one RMW opcode, two independent operations may be performed on two different portions of data (same or different sized) from a memory operand. It is noted that any operation, described above, that may be performed on a memory operand may be performed on both portions.

As mentioned above, storage 23 may hold a number of write base addresses in a number of storage locations. Memory controller 25 may load the memory base addresses into storage 23 using a write base command frame that may be similar to the frames shown in FIG. 3-FIG. 5. More particularly in one embodiment, a write base command frame may include a write base command in either command slot of a standard frame. The write base command may include a write base opcode, a base address and a partition. Upon receiving a write base command frame, control unit 22 may write the base address in the frame into one of the storage locations.

Figure 6:
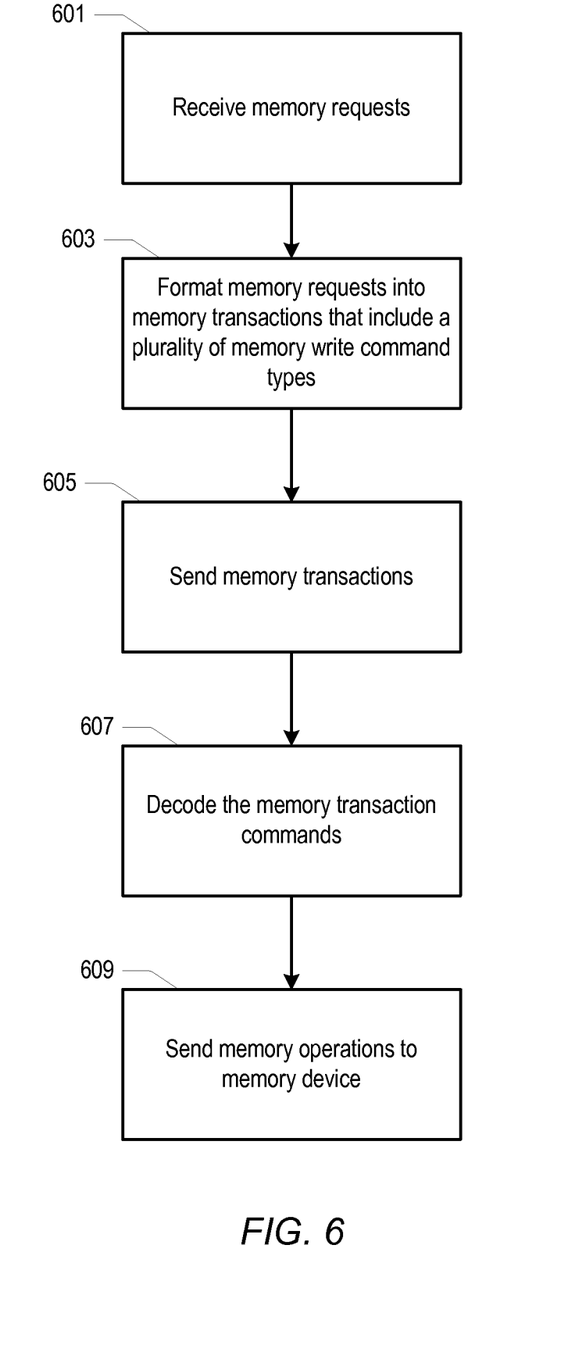
FIG. 6 is a flow diagram describing the operation of an embodiment of the system shown in FIG. 1.

Turning to FIG. 6, a flow diagram describing the operation of an embodiment of the system of FIG. 1 is shown. Beginning in block 601, the memory controller 25 receives memory requests from the router 27. The memory controller 25 formats the memory requests into memory transactions (block 603). As described above, depending on the bandwidth available and other factors, memory controller 25 may use any of the memory write commands to write data to the memory device 20. More particularly, as shown in the preceding figures and described above, if there are a number of read and write requests outstanding for example, memory controller 25 may utilize the scheduling variability of the write commands as well as the ability to include a read command in the same command frame as a write command. Alternatively, if there is a burst of data, memory controller 25 may utilize the memory write burst command as shown in FIG. 4B. As described above, one or more write, read, and/or RMW frames may formatted at the transaction layer.

Once the memory transactions have been formatted, memory controller 25 may transmit the memory transactions to the memory subsystem 15 via the interface 33 (block 605). The formatted frames may be sent via a physical layer upon the interface 33.

Upon receipt of the memory transaction commands, control unit 22 decodes the commands in each of the frames (block 607). Once a command is decoded, control unit 22 may reformat the command and send it to the memory device 20 (block 609). More particularly, in the case of a write command, control unit 22 may send the data to an address in the memory device 20. In the case of a read command, control unit may perform a read operation on memory device 20, and when the requested data is returned by memory device 20, control unit 22 may send the requested data back to memory controller 25. However, in the case of a RMW command, the control unit 22 may perform a read operation of a particular memory address as calculated by the control unit 22 from the information in the RMW frame. Control unit 22 may then modify the read data as specified in the RMW opcode, and then write the modified data back to the address in memory device 20.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory subsystem, comprising:
a memory device comprising a plurality of independently accessible memory partitions; and
a control unit coupled to the memory device and configured to read and write data to the memory device in response to receiving memory transactions via a memory interface;
wherein the control unit is configured to perform memory transactions that include a memory write burst command having a first frame that specifies a starting address in the memory device, and further having a plurality of subsequent frames for conveying a data payload; and
wherein the control unit is configured to generate a number of memory write operations to the memory in response to receiving the memory write burst command, wherein the memory write operations write the data payload from each subsequent frame to a different memory partition, beginning with a partition specified in the memory write burst command, wherein the data payload is written to the different memory partitions at the starting address.

2. The memory subsystem of claim 1, wherein the partitions are numbered sequentially from a first partition to a last partition.

3. The memory subsystem of claim 2, wherein the first frame includes an opcode for the memory write burst command positioned in a first command slot or a second command slot, wherein the opcode specifies which frames of the plurality of subsequent frames convey the data payload and a condition for incrementing the starting address.

4. The memory subsystem of claim 2, wherein the control unit is configured to sequentially write to the different memory partitions in an order specified in a partition access pattern, wherein the order includes each partition from the first partition to the last partition, and wherein the order repeats.

5. The memory subsystem of claim 3, wherein the control unit is configured to change an address at which the partitions are written from the starting address to a different address in response to a number of subsequent data payload frames exceeding a number of partitions, and in response to writing to the last partition.

6. The memory subsystem of claim 3, wherein the control unit is configured to change an address at which the partitions are written from the starting address to a different address in response to a number of subsequent data payload frames exceeding a number of partitions, and prior to writing to any partition a second time.

7. The memory subsystem of claim 3, wherein the memory transactions include a memory read burst command having a single frame that includes a corresponding opcode positioned in one of the first command slot or the second command slot, and wherein the control unit is configured to generate a number of memory read operations to the memory in response to receiving the memory read burst command.

8. The memory subsystem of claim 7, wherein the control unit is configured to sequentially read data from a same read address in a different memory partition beginning with the partition specified in the memory read burst command, wherein the read address is specified in the memory read burst command.

9. The memory subsystem of claim 8, wherein a number of read operations is specified by the opcode in the memory read burst command.

10. The memory subsystem of claim 8, wherein the control unit is configured to sequentially read from the different memory partitions in an order specified in a memory access pattern, wherein the order includes each partition from the first partition to the last partition, and wherein the order repeats.

11. The memory subsystem of claim 8, wherein the control unit is configured to change the read address in response to a number of read operations exceeding a number of partitions, and in response to reading from the last partition.

12. The memory subsystem of claim 8, wherein the control unit is configured to change the read address in response to a number of read operations exceeding a number of partitions, and prior to reading from any partition a second time.

13. The memory subsystem of claim 7, wherein a given first frame of a memory transaction including the memory write burst command further includes an opcode corresponding to a memory read burst command positioned in the remaining slot of the first command slot or the second command slot.

14. The memory subsystem of claim 7, wherein the control unit is configured to concurrently transmit data corresponding to the memory read burst command on a first communication lane and receive data corresponding to the memory write burst command on a second communication lane.

15. The memory subsystem of claim 7, wherein a given first frame of a memory transaction including the memory write burst command further includes an opcode corresponding to a memory read command positioned in the remaining slot of the first command slot or the second command slot.

16. The memory subsystem of claim 1, wherein the control unit is configured to receive command and data frames on a same communication lane.

17. The memory subsystem of claim 1, wherein the memory transactions include a first memory write burst command having a first opcode specifying a first number of subsequent data payload frames followed by a second memory write burst command having a second opcode specifying a different number of subsequent data payload frames.

18. A system, comprising:
a system memory unit including a control unit coupled to a memory device, wherein the memory device comprises a plurality of independently accessible memory partitions; and
a host device coupled to the system memory unit via a memory interface, wherein the host device is configured to initiate memory transactions to the system memory unit;
wherein the control unit is configured to read and write data to the memory device in response to receiving the memory transactions;
wherein the memory transactions include a memory write burst command having a first frame that includes a corresponding opcode and a starting address in the memory device, and further having a plurality of subsequent frames for conveying a data payload; and
wherein the control unit is configured to generate a number of memory write operations to the memory device in response to receiving the memory write burst command, and wherein the control unit is further configured to write the data payload from each subsequent frame to a different memory partition, beginning with a partition specified in the memory write burst command, wherein the data payload is written to the different memory partitions at the starting address.

19. The system of claim 18, wherein the opcode of the memory write burst command is positioned in one of a first command slot or a second command slot, and specifies:
which frames of the plurality of subsequent frames convey an associated data payload; and
a condition for incrementing the starting address as part of the memory write burst command.

20. A memory subsystem, comprising:
a memory device including one or more memory arrays, wherein the memory device comprises a plurality of independently accessible memory partitions; and
a control unit coupled to the memory device and configured to read and write data to the one or more memory arrays in response to receiving memory transactions via a memory interface;
wherein the memory transactions include a memory write broadcast command having a first frame that includes a corresponding opcode, and one or more subsequent frames for conveying a data payload; and
wherein in response to receiving the memory write broadcast command, the control unit is configured to generate a number of memory write operations to write the same data payload to a number of the partitions within the memory device in an order specified in a partition access pattern.

21. The memory subsystem of claim 20, wherein the partitions are numbered sequentially from a first partition to a last partition.

22. The memory subsystem of claim 21, wherein the order includes each partition from the first partition to the last partition, and wherein the order repeats.

23. The memory subsystem of claim 20, wherein the control unit is configured to write to all of the partitions.

24. The memory subsystem of claim 20, wherein the control unit is configured to write to a portion of the partitions.

25. The memory subsystem of claim 24, wherein the control unit is configured to write to the portion of the partitions sequentially with no intervening unwritten partitions.

26. The memory subsystem of claim 24, wherein the control unit is configured to write to the portion of the partitions sequentially and interleaved such that one or more unwritten partitions intervene between the written partitions.

27. The memory subsystem of claim 21, wherein the memory transactions include a memory read command having a single frame that includes a read broadcast opcode positioned in one of a first command slot or a second command slot, and wherein the read broadcast opcode specifies to the control unit to generate a memory read operation to a next partition specified in the partition access pattern.

28. The memory subsystem of claim 21, wherein the memory transactions include a memory read command having a single frame that includes a read opcode and a predetermined partition identifier positioned in one of a first command slot or a second command slot, and wherein the predetermined partition identifier specifies to the control unit to generate a memory read operation to a next partition specified in the partition access pattern.

29. The memory subsystem of claim 20, wherein a given first frame of a memory transaction including the memory write broadcast command that is positioned in one of a first command slot or a second command slot further includes an opcode corresponding to a memory read burst command positioned in the remaining slot of the first command slot or the second command slot.

30. The memory subsystem of claim 20, wherein a given first frame of a memory transaction including the memory write broadcast command that is positioned in one of a first command slot or a second command slot further includes an opcode corresponding to a memory read command positioned in the remaining slot of the first command slot or the second command slot.

31. The memory subsystem of claim 21, wherein the memory transactions include a memory read command having a frame that includes a read opcode and an address that was previously written with a memory write broadcast command, and wherein in response to receiving the memory read command the control unit is configured to read from any partition at the address.

32. A memory subsystem comprising:
a memory device including one or more memory arrays, the memory device comprising a plurality of independently accessible memory partitions; and
a control unit coupled to the memory device and configured to read and write data to the one or more memory arrays in response to receiving memory transactions via a memory interface;
wherein the memory transactions include a memory write broadcast block command having a first frame that includes a corresponding opcode, and one or more subsequent frames for conveying a data payload including data block comprising a number of sequential data portions; and
wherein in response to receiving the memory write broadcast block command, the control unit is configured to generate a number of memory write operations to write the same data payload to a number of the partitions in an order specified in a partition access pattern and at a number of sequential addresses beginning with an address included in the memory write broadcast block command.

33. The memory subsystem of claim 32, wherein the partitions are numbered sequentially from a first partition to a last partition.

34. The memory subsystem of claim 33, wherein the order includes each partition from the first partition to the last partition, and wherein the order repeats.

35. The memory subsystem of claim 32, wherein the number of the partitions written is less than a total number of the partitions in the plurality of partitions.

36. The memory subsystem of claim 32, wherein the number of the partitions written is a total number of the partitions in the plurality of partitions.

37. A method comprising:
receiving memory transactions for reading data from and writing data to a memory unit, the memory unit having a memory device comprising a plurality of independently accessible memory partitions, wherein the memory transactions include a memory write burst command having a first frame that includes a corresponding opcode positioned in one of a first command slot or a second command slot and also includes a starting address in the memory device, wherein the memory write burst command also has a plurality of subsequent frames for conveying a data payload, wherein the opcode of a given memory write burst command specifies which frames of the plurality of subsequent frames convey the data payload and further specifies a condition for incrementing the starting address; and
generating a number of memory write operations to the memory unit in response to receiving the memory write burst command, and wherein the memory write operations include sequentially writing the data payload from each subsequent frame to different memory partitions, beginning with a partition specified in the memory write burst command, wherein, as part of the memory write operations, the data payload is written to the different memory partitions at the starting address.

38. The method of claim 37, wherein the partitions are numbered sequentially from a first partition to a last partition.

39. A method comprising:
receiving memory transactions for reading data from and writing data to a memory unit, wherein the memory unit comprises a plurality of independently accessible memory partitions, and wherein the memory transactions include a memory write broadcast command having a first frame that includes a corresponding opcode, and one or more subsequent frames for conveying a data payload; and
generating a number of memory write operations to write the same data payload to a number of the partitions within the memory unit in response to receiving the memory write broadcast command, wherein the number of the partitions is specified by the corresponding opcode of the memory write broadcast command.

40. The method of claim 39, wherein the partitions are numbered sequentially from a first partition to a last partition.

41. The method of claim 40, further comprising sequentially writing to different ones of the plurality of memory partitions in an order specified in a partition access pattern, wherein the order includes each partition from the first partition to the last partition, and wherein the order repeats.

42. The method of claim 40, wherein the memory transactions include a memory read command having a frame that includes a read opcode and an address that was previously written with a memory write broadcast command, and wherein the method further comprises reading from any partition at the address in response to receiving the memory read command.

43. A method comprising:
receiving memory transactions for reading data from and writing data to a memory unit having a plurality of independently accessible memory partitions, and wherein the memory transactions include a memory broadcast block command having a first frame that includes a corresponding opcode, and one or more subsequent frames for conveying a data payload including a data block comprising a number of sequential data portions; and generating a number of memory write operations to write the same data payload to a number of the partitions within the memory unit in response to receiving the memory broadcast block command, wherein the number of the partitions is specified by the corresponding opcode.

* * * * *